United States Patent
Joynson et al.

[11] 3,982,227
[45] Sept. 21, 1976

[54] PATTERN RECOGNITION MACHINE FOR ANALYZING LINE ORIENTATION

[75] Inventors: Reuben E. Joynson, Alplaus; Joseph L. Mundy, Schenectady, both of N.Y.

[73] Assignee: General Electric Company, Schenectady, N.Y.

[22] Filed: June 2, 1975

[21] Appl. No.: 582,689

[52] U.S. Cl. ............ 340/146.3 AE; 340/146.3 MA
[51] Int. Cl.² ......................................... G06K 9/00
[58] Field of Search ........... 340/146.3 AE, 146 MA; 179/15 BC

[56] References Cited
UNITED STATES PATENTS
3,815,090   6/1974   Muenchhausen........ 340/146.3 MA

*Primary Examiner*—Joseph M. Thesz
*Attorney, Agent, or Firm*—Jack E. Haken; Joseph T. Cohen; Jerome C. Squillaro

[57] ABSTRACT

A pattern recognition system for determining the angle of line or edge information in video data scenes generates angle information from the values of low order Hadamard transform coefficients. Ridges in the values of the elements of the Hadamard transform matrix of the scene are also searched to locate angle information.

18 Claims, 6 Drawing Figures

PATTERN RECOGNITION MACHINE FOR ANALYZING LINE ORIENTATION

BACKGROUND OF THE INVENTION

This invention concerns machines for recognizing and extracting information from patterns of data. More specifically this invention concerns machines for determining the angle and orientation of lines in a two dimensional scene by use of Hadamard transform coefficients.

Machines for extracting information from large sets of data have become increasingly important in the automation arts. These machines are capable of recognizing information contained in the featues of the data set and of rejecting noise or background information. Pattern recognition machinery of this type presently finds use in optical character readers, guidance and inspection systems, and many other sectors of that art. Often the data set is in the form of video scene information which may, for example, be derived from a television camera pickup or from a radar or sonar scanning system.

Early pattern recognition machines operated by comparing small sectors of scene data with suitable masks representing the desired pattern information. More useful information can be extracted from such scene data, however, if the pattern information produced is of a more fundamental nature. For example, if the position and angle of a line or edge in the scene is known, it is possible, by the application of relatively simple data manipulation, to follow and trace the path of that line or edge.

It is well known that any function having finite energy may be expressed as the sum of a series of orthogonal functions. In 1923 Joseph L. Walsh devised a complete set of orthogonal functions, now known as Walsh functions, which are especially useful for the representation of binary waveforms. Walsh functions, which are denoted by the expression $$wal\ (s,t),$$

are binary functions having values of +1 and −1 in the unit interval. The sequency, $s$, of a Walsh function is defined herein as the number of times the value of that function changes sign within the unit interval (the term "sequency" is also used in the literature to denote one-half the number of sign changes in the unit interval). The sequency of a Walsh function may be seen to be somewhat analogous to the frequency of the more common sine or cosine functions.

A series of Walsh functions may be expressed in a matrix, known as a Hadamard matrix, in which elements ae either +1 or −1 and in which the respective row vectors and the respective column vectors are mutually orthogonal. The values of the elements in a row or column of a Hadamard matrix represent the values of a Walsh function over sequential segments of the unit interval. Successive examination of the rows or columns of a Hadamard matrix yields a set of Walsh functions which are known as Hadamard functions denoted $$H(n,t).$$

The natural order $n$, of a Hadamard function denotes the order in which that function is generated from a hadamard matrix in the maner described above which is not the sequency order. Further discussion of the properties of Hadamard and Walsh functions and of algorithms for generating Hadamard matrices may be found in H. F. Harmuth, *Transmission of Information by Orthogonal Functions*, Second Edition, Springer-Verlag, 1972.

The Walsh transform vector $\bar{w}_a$ of a binary function vector $f$ may be expressed in matrix notation as:

$$\bar{w}_a = [\ wal\ ]\bar{f}_a \tag{1}$$

where $[\ wal\ ]$ is a matrix whose rows are sequency ordered Walsh functions. The order of Walsh transform, as defined herein, means the number of dimensions in the vector $\bar{w}_a$ which may be seen to equal the rank of the matrix $[\ wal\ ]$.

Machines for generating the value of Walsh functions are well known in the computing arts. For example, U.S. Pat. No. 3,701,143 to Nacht, U.S. Pat. No. 3,795,864 to Fullton, Jr., and U.S. Pat. No. 3,742,201 to Groginski, describes such machines. Our copending U.S. patent application, Ser. No. 563,820 of common assignee describes a fast hadamard transform generating machine which yields serial streams of Hadamard transform coefficients in sequency order.

Two dimensional Hadamard transforms may be used to represent variations in brightness over a two dimensional video scene. Further information on the generation and use of two dimensional Hadamard transforms in this application may be found in the above-mentioned Harmuth reference. Our copending patent application, referenced above, describes a machine for generating a matrix of two dimensional Hadamard transform coefficients from video information.

SUMMARY OF THE INVENTION

In accordance with the present invention, we provide machines for extracting angle and orientation information from lines and edges in a video scene. The scene information is encoded into an electrical data signal by a television camera or other similar device. This data is processed to yield a two dimensional, sequency order Hadamard transform coefficient matrix, the elements of which matrix are processed to yield output data indicating the angle of lines and edges within the scene.

In one embodiment of this invention, low order, two dimensional Hadamard transform coefficients are summed along each axis of the scene. The arctangent of the ratio of these sums indicates the angle of line or edge information within the scene. In this embodiment the Hadamard transformation process functions as a video information low pass filter to reduce the effects of spurious noise in the angle determination process.

In another embodiment of the invention, selected strips of elements in the two dimensional Hadamard transform coefficient matrix are searched for maximum values. The position of a maximum value element in the first strip searched is used as a guide to further searches of data strips until a high order element having a maximum value within a strip is found. The position of the maximum value element in the matrix is used to calculate the line and edge angle data of the original scene.

It is, therefore, an object of this invention to provide machines for efficiently extracting line and edge angle data from scene information.

Another object of this invention is to provide machines for recognizing line angle and edge angle characteristics in two dimensional data patterns.

Another object of this invention is to provide machines for utilizing the Hadamard Transform in adaptively determining pattern information from video data sets.

BRIEF DESCRIPTION OF THE DRAWINGS

The novel features believed to be characteristic of the present invention are set forth in the appended claims. The invention itself, together with further objectives and advantages thereof, may best be understood with reference to the following detailed description, takin in connection with the appended drawings in which:

DESCRIPTION OF THE PREFERRED EMBODIMENTS

Figure 1:
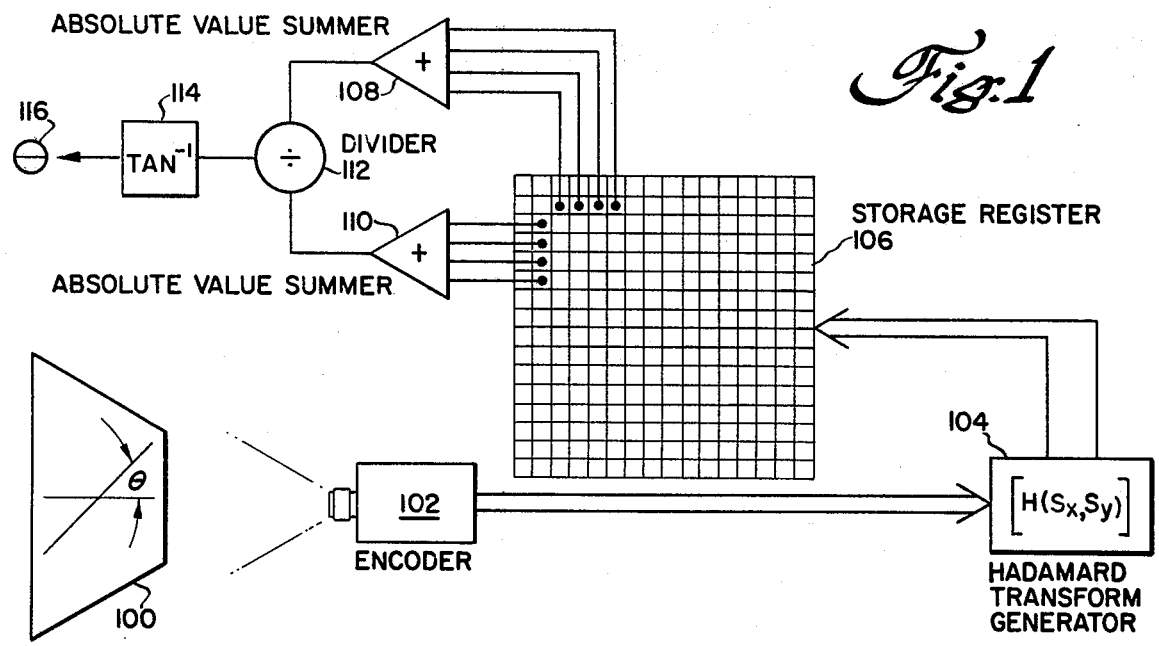
FIG. 1 is a schematic representation of a machine for extracting line and edge angle information from a video scene.

The present invention provides machines for determining the characteristics of lines and area edges in two dimensional sets of data. Large fractions of the information in many scenes may be efficiently derived from the direction and orientation of these data features. For example, when the position and direction of a line element is known, relatively simple algorithms may be derived for tracing the course of that line through the scene. The direction of line and edge elements on the periphery of a small subset of a larger scene may be used to direct a pattern recognition machine toward concentrations of relevant information in neighboring scene areas.

We have determined that line angle and scene edge characteristic information may be efficiently derived by processing video data in the two dimensional Hadamard transform domain. The Hadamard transform process serves to filter noise and allows speedy extraction of relevant information. The Hadamard transform generator of our copending U.S. patent application, Ser. No. 563,820, allows speedy conversion of serial scene data to the two dimensional Hadamard transform coefficients used in the present system.

The components of the circuits which are used in combination to produce the pattern recognition machinery of the present invention are well known to the signal processing and computer arts. Therefore, in the following descriptions and in the drawings, these components and circuits are referenced in terms of functional blocks rather than by specific circuit descriptions. It is to be understood that machines in accordance with present invention may be constructed in digital computer form; in which case the above-mentioned circuit components may, by way of example, comprise digital registers, core or active memory elements, digital adders, subtractors, multipliers, multiplexers, and other elements well known to the digital computer art. Likewise, machines in accordance with the present invention may be constructed in analog processor form, in which case the circuit components may, for example, comprise analog sample and hold circuits, operational sum and difference amplifiers, analog multipliers, multiplexers and switching circuits, and the like. Persons skilled in the art will likewise recognize that a general purpose digital computer may be operated in a manner to simulate the operation of the above-mentioned digital or analog circuit elements. Likewise, a suitably connected and programmed analog computer will function in the same manner as the above-described circuit elements and may be used to simulate or operate in the same manner as the described machines. It is intended by the present invention to include all such machines as comprise computational modules which, being functionally connected in the topology described below, function to compute line angle and scene peripheral segment characteristics within the scope of the claimed invention.

The scene information in the following descriptions of the embodiments of our invention is represented as pictorial data which is encoded by means of television scanning devices. It is to be understood, however, that these forms are merely illustrative of the operation of the invention and that the scene data may, for example, represent pictorial information, written information, radar or sonar return information, or any other two dimensional data set. Likewise the electrical scene encoding devices utilized with the invention may, for example, comprise television cameras, solid state scanning devices, computer memory elements, radar or sonar receivers, or other information storage or production devices, of any type, known to the various arts.

FIG. 1 is an embodiment of the present invention for deriving line and edge angle information from scene data. A pictorial scene 100 is scanned by an electrical encoder, in this case a television camera 102, to produce an electrical signal representative of the scene 100 information. Scene information from the encoder 102 is processed in a Hadamard transform generator circuit 104 to yield two dimensional Hadamard transform coefficients of the scene. The Hadamard transform coefficients produced by the generator 104 are stored in sequency ordered matrix form in a storage register 106. Our copending patent application, referenced above, describes a machine for generating sequency ordered Hadamard transform coefficients which may be used as the Hadamard transform generator 104. Likewise, the Hadamard transform generator of the above-referenced Groginsky patent may be used in the present circuit if suitable routing elements are provided to store the elements of its output signal by sequency order in the storage register 106.

If the Hadamard transform matrix stored in register 106 is represented as:

$$[H(S_x, S_y)] \qquad (1)$$

where $S_x$ represents the column index of a matrix element and $S_y$ represents the row index of that element. We have determined that the angle of line and edge information, $\theta$, in the scene 100 may be computed using the equation:

$$\theta = \mathrm{TAN}^{-1} \frac{H(2,1)+H(3,1)+H(4,1)+H(5,1)}{H(1,2)+H(1,3)+H(1,4)+H(1,5)} \qquad (2)$$

An output signal representative of the angle, $\theta$, calculated in accordance with equation (2) is derived by connecting the inputs of an absolute value summing circuit 108 to the outputs of the storage register 106 representative of the matrix elements H(2,1), H(3,1), H(4,1), and H(5,1). The inputs of a second absolute value summing circuit 110 are likewise connected to the outputs of the storage register 106 representative of the matrix elements H(1,2), H(1,3), H(1,4), and H(1,5). The outputs of the absolute value summing circuits 108 and 110 are connected to a divider circuit 112 which produces at its output a signal representative of the quotient of the output of the signal of the summing circuit 110 divided by the output signal of the summing circuit 108. The output of the divider circuit 112 is applied to an arctangent generating circuit 114 which produces an output signal 116 representative of the angle having an arctangent equal to the quotient of the output signal of the absolute value summing circuit 110 divided by the output signal of the absolute value summing circuit 108.

Circuits for generating the arctangent function are well known in the computing art. For example, the arctangent generator 114 may be a digital microcomputer operating under the control of a permanently stored microprogram to yield a digital output function equal to the arctangent of its input function. In analog circuit configurations, the arctangent generator circuit 114 may comprise a circuit described in the *Guide Book of Electronic Circuits*, John Markus, page 406, McGraw-Hill, 1974. An arctangent generator may also be constructed using electromechanical resolver components in a manner well known to that art.

We have determined that lines or edges in original scene data form ridges in the corresponding Hadamard transform matrix of that scene. The ridges in the Hadamard transform matrix are generally oriented normal to the line or edge direction of the original scene. In accordance with a second embodiment of our invention we provide a machine for determining scene angles by locating ridges in the corresponding Hadamard transform matrix.

Figure 2A:
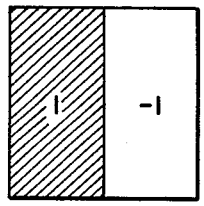
FIGS. 2a–2c represent two dimensional Hadamard functions of order one.
Figure 2B:
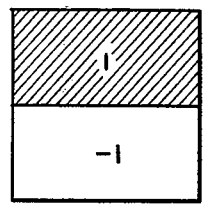
Figure 2C:
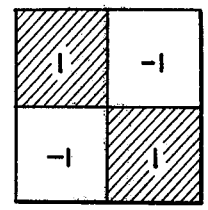

The principles of operation of this embodiment may be understood by reference to FIGS. 1a through 2c which illustrate two dimensional Hadamard functions of order 1. FIG. 2a illustrates the two dimensional Hadamard function having a sequency of 1 along the horizontal or X axis and a sequency of 0 along the vertical or Y axis. Scene data having generally vertical lines or edges will contain a strong component of this Hadamard function and will tend to have maximum Hadamard matrix element values lying to the right of the origin. FIG. 2b represents the Hadamard function having a sequency of 0 in the horizontal direction and a sequency of 1 in the vertical direction. Scenes containing lines or edges having a generally horizontal orientation will contain strong components of this Hadamard function and will tend to have maxima in their Hadamard transform matrices lying below the origin. FIG. 2c represents the Hadamard matrix having a sequency of 1 along the horizontal axis and a sequency of 1 along the vertical axis. Scenes containing diagonal line data will have a strong component of this function and will have maxima in their Hadamard transform matrices lying along a diagonal below and to the right of the origin.

In accordance with a second embodiment of the invention we perform a directed search of selected groups of elements from the Hadamard transform coefficient matrix of scene data to determine the position of maximum value elements within those groups. The location of the maximum value element in each data group uniquely determines, in a manner more fully described below, a particular data group which is subsequently searched for a new, maximum value element. The search continues until one of two conditions is met:

1. No clear maximum value is found in the last data group searched; or
2. The sequency of the group searched is $(N/2)-1$; where N is the rank of the Hadamard transform matrix; that is, the line resolution of the original scene.

The search procedure utilized in the present embodiment of the invention will function with any scene resolution which is capable of representation as a Hadamard matrix. For the purposes of illustration however, the following description of this preferred embodiment utilizes a scene comprising 16 × 16 information elements and having a corresponding Hadamard transform coefficient matrix of rank 16.

Figure 3:
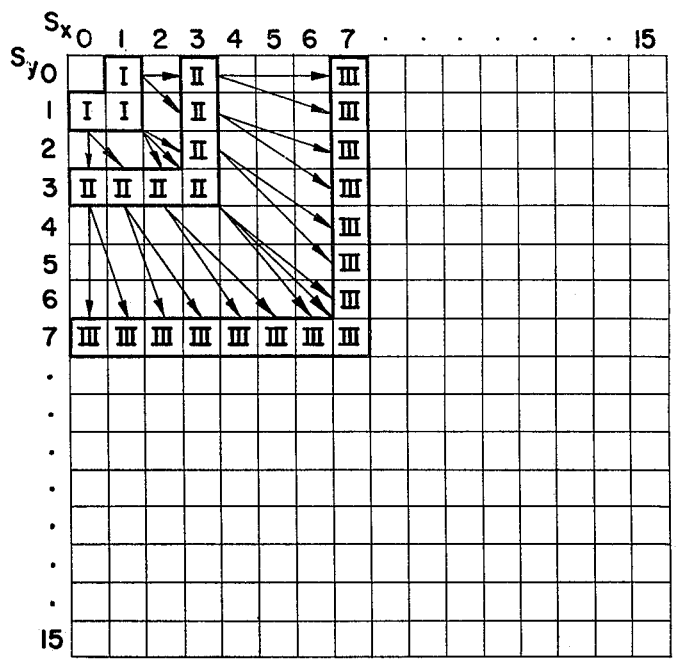
FIG. 3 graphically represents the sequence for an adaptive search of a 16 × 16 matrix used in a machine for determining line and edge angle information from a two dimensional video scene.

FIG. 3 illustrates the search procedure in the present invention which begins with the examination of the matrix elements H(1,0), H(1,1), and H(0,1). The values of these elements are compared and that element having a maximum value is identified. A second group of elements to be searched for maximum values is determined from the address of the element in this first group having a maximum value. Thus, if the element H(0,1) has a value greater than that of the elements H(1,0) and H(1,1) the second group searched contains the elements H(0,3) and H(1,3). Likewise, if the element H(1,1) has the maximum value, the second group searched contains the element H(2,3), H(3,3), and H(3,2).

The elements of the second group searched are compared and the element of that group having a maximum value identified. The address of that maximum element is then used, in a manner similar to that described above, to determine the elements of the next group searched. FIG. 3 graphically illustrates in order of groups searched as determined by the address of the maximum value elements in a prior group.

The search generally continues in this manner until one of the two conditions stated above is satisfied. For the 16 × 16 element matrix used in the present illustration, the maximum sequency examined is 7. The search will, therefore, continue until either: (1) a group is searched having no element with a clearly defined maximum value; or (2) a group having elements with a sequency 7 is searched. Upon satisfaction of one or the other of these conditions, the tangent of line and edge angles in the original scene may be determined from the address of the last coefficient which was examined and found to have a clearly defined maximum value within its group by use of the formula:

$$\text{TAN } \theta = S_x/S_y \qquad (3)$$

where $S_x$ and $S_y$ are respectively the horizontal sequency and the vertical sequency of that last element. The angle $\theta$ may then be identified by taking the arctangent of the ratio $S_xS_y$.

The sign of the angle, $\theta$, may be computed from the values of the Hadamard transform coefficient submatrix elements adjoining that last, maximum value, element, $$\begin{bmatrix} H(S_x,S_y) & H(S_x+1,S_y) \\ H(S_x,S_y+1) & H(S_x+1,Sy+1) \end{bmatrix} \quad (4)$$

by using the formula:

$$\theta = |H(S_x+1,S_y)+H(S_x,S_y+1)| - |H(S_x,S_y)+H)S_x+1,S_y+1)| \quad (5)$$

where the bars || signify the absolute value operation.

Although the search procedure described above has been illustrated for the case of a 16 × 16 element matrix, it is to be understood that this search may be continued for matrices of greater rank. Thus the first group in any search will contain those Hadamard transform matrix elements representing sequencies of 1, while the second group in any search will contain elements having sequencies of 3 and further groups will contain elements having sequencies, S:

$$S = 2n+1 \quad (6)$$

where $n$ is the common sequency of the elements in the last group searched.

It may be seen that each group searched, after the first group, contains matrix elements $H_{2x+1, 2y+1}$ and $H_{2x+1, 2y}$ if $x \geq y$ and matrix elements $H_{2x+1, 2y+1}$ and $H_{2x+1, 2y+1}$ if $y \geq x$; where $x$ and $y$ are the two dimensional sequencies associated with the maximum value element of the last group searched. The search will terminate if either (1) elements in the next group to be searched would contain an element having a sequency greater than $(N/2)-1$, where N is the rank of the matrix $[H(S_x, S_y)]$; or (2) if no element having a clear maximum value is located.

The address of a maximum value element in a group from the Hadamard transform coefficient matrix uniquely establishes the members of the next group to be searched. Thus, upon identifying a maximum value element, the addresses of the next element group to be examined may easily be obtained from a relatively short table which may, for example, be stored in a read-only memory. By way of illustration, Table 1, below, may be utilized in this fashion for the 16 × 16 matrix of the present example.

TABLE 1

| Maximum Value Element $S_x, S_y$ | Next Group $S_x, S_y$ | $[TAN^{-1}(S_x/S_y)]$ |
|---|---|---|
| 1,0 | 3,0 & 3,1 | 90° |
| 1,1 | 3,2 & 3,3 & 2,3 | 45° |
| 0,1 | 2,0 & 2,1 | 0° |
| — | | |
| 3,0 | 7,0 & 7,1 | 90° |
| 3,1 | 7,2 & 7,3 | 72° |
| 3,2 | 7,4 & 7,5 | 56° |
| 3,3 | 7,6 & 7,7 & 6,7 | 45° |
| 2,3 | 5,7 & 4,7 | 34° |
| 1,3 | 3,7 & 2,7 | 18° |
| 0,3 | 1,7 & 0,7 | 0° |
| — | | |
| 7,0 | End | 90° |
| 7,1 | " | 82° |
| 7,2 | " | 74° |
| 7,3 | " | 67° |
| 7,4 | " | 60° |
| 7,5 | " | 54° |
| 7,6 | " | 49° |
| 7,7 | " | 45° |
| 6,7 | " | 41° |
| 5,7 | " | 36° |
| 4,7 | " | 30° |
| 3,7 | " | 23° |

TABLE 1-continued

| Maximum Value Element $S_x, S_y$ | Next Group $S_x, S_y$ | $[TAN^{-1}(S_x/S_y)]$ |
|---|---|---|
| 2,7 | " | 16° |
| 1,7 | " | 8° |
| 0,7 | " | 0° |

The address of the coefficient element having the last clear maximum value, as determined in the search procedure above, uniquely identifies the angle of line or edge information in the original scene. Thus, the values of the function $TAN^{-1}(S_x/S_y)$ may be stored in a similar table or read-only memory and, upon determining the address of the last clear maximum value element, be recalled without computation. The values of these angles, as determined by this function, are similarly listed for each maximum value element address in Table 1.

Figure 4:
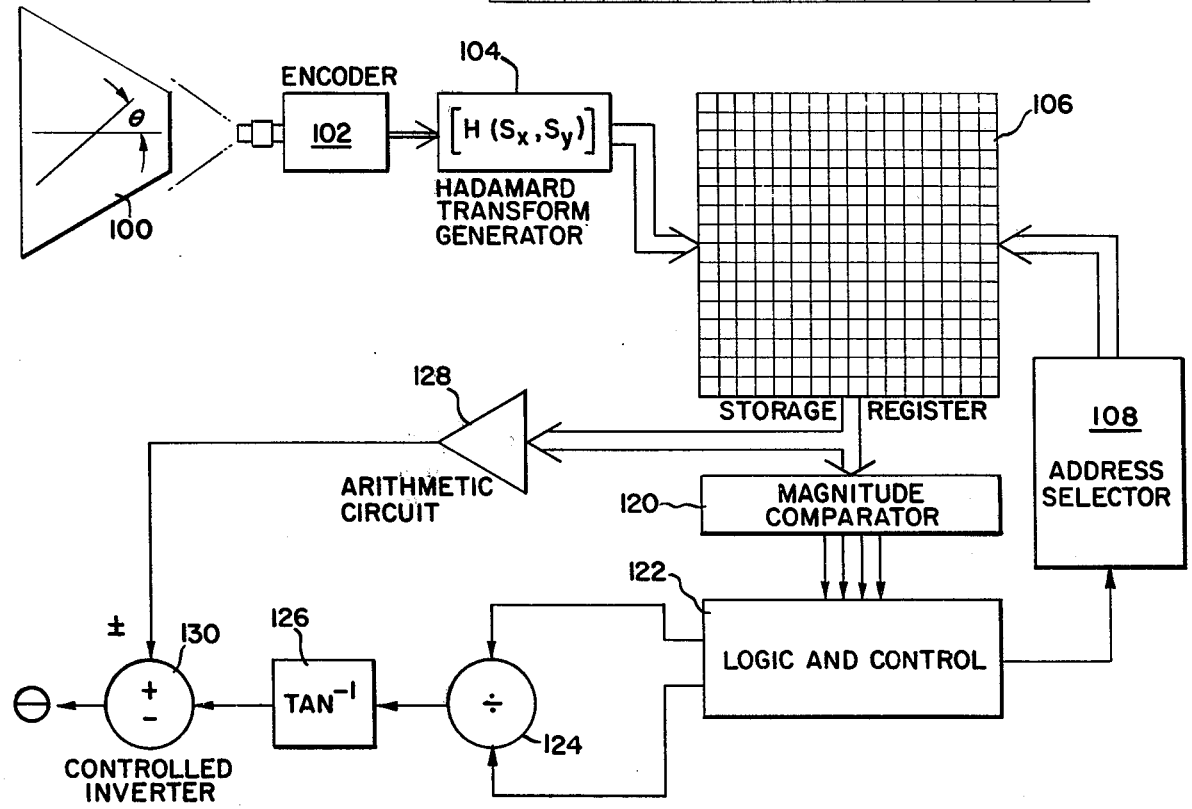
FIG. 4 is a machine for extracting line and edge angle information from two dimensional scene data which utilizes the search sequence of FIG. 3.

FIG. 4 is a machine for determining line angle or edge angle information in accordance with this embodiment of our invention. An original scene 100 is scanned by an encoder 102 in the manner described above. The output of the encoder is applied to a Hadamard transform generator circuit 104 which produces, as an output, the sequency ordered, two dimensional Hadamard transform matrix of the original scene 100. The output of the Hadamard transform generator 104 is applied to a storage register 106 as in the previous embodiment. An address selector circuit 108 is connected to the storage register 106 and supplies thereto the addresses of selected matrix elements. The values of the elements then appear at the output of the register 106. The outputs of the register are connected to a magnitude comparator 120 which compares the values of the matrix elements appearing at the output of the storage register 106 and identifies that element having the largest value. The output of the magnitude comparator 120, a signal identifying the address of the maximum value element received from the storage register 106, is applied to a logic and control circuit 122 which, by means of stored data of the type illustrated in Table 1, activates the address selector 108 to recover the values of a next group of matrix elements from the storage register 106.

If the magnitude comparator circuit 120 is unable to identify any element in a group as a maximum element, or if the logic and control circuit determines from the table that the end of the search has been reached, the address of the last identified maximum value matrix element is applied to a divider circuit 124 which produces at its output a signal representative of the value of $S_yS_x$. The output of the divider circuit 124 is applied to an arctangent generator 126 the output of which, in accordance with the above-cited equation, produces an output signal representative of the magnitude of the angle of information in the scene 100. As indicated above, the functions of divider circut 124 and of the arctangent generating current 126 may be combined in a read-only memory circuit containing, in permanent storage, the values of the angles associated with the address of each element.

Upon determining the end of a search, the logic and control circuit 122 acting through the addresss selector circuit 118 causes the storage register 106 to recover the values of the elements of a rank 2 submatrix, the upper left element of which is the last identified, maximum value coefficient. The values of the elements of this submatrix are applied to an arithmetic circuit 128 which determines the sign of the submatrix (4) using equation (5). The output of the arithmetic circuit 128 controls an inverter 130 acting on the output of the arctangent generator 126. The output of the inverter circuit 130 is thus, in accordance with the above-cited equations, representative of the angle and sign of line or edge information contained in the original scene 100.

In accordance with the present invention we have provided circuits for extracting scene pattern information by utilization of the Hadamard transform coefficient matrix of that scene. The circuits provide efficient noise rejection and information extraction capabilities and produce more useful information, with fewer components, than do pattern recognition machines of the prior art.

While the invention has been described in detail herein in accord with certain embodiments thereof, many modifications and changes therein may be effected by those skilled in the art. Accordingly, it is intended by the appended claims to cover all such modifications and changes as fall within the true spirit and scope of the invention.

The invention claimed is:

1. A computing machine for determining the angle of line and edge information from a two-dimensional data scene, comprising in combination:

first data means for producting a first signal representative of the sum of a first set of two dimensional Hadamard transform coefficients of a scene, said first set consisting of the Hadamard transform coefficients having a sequency of one along a first axis of said scene and sequencies of two, three, four, and five along a second axis of said scene;

second means for producing a second signal representative of the sum of a second set of two-dimensional Hadamard transform coefficients of said scene, said second set consisting of the Hadamard transform coefficients having a sequency of one along said second axis of said scene and sequencies of two, three, four and five along said first axis of said scene;

dividing circuit means for producing a third signal representative of the quotient of said first signal divided by said second signal;

arctangent calculating circuit means for producing an output signal proportional to the arctangent of said third signal, whereby said output signal is representative of the angle of line and edge information in said scene with said first axis.

2. The computing machine of claim 1 wherein said first means and said second means comprise a Hadamard transform calculating circuit.

3. The calculating machine of claim 2 wherein said first means and said second means further comprise storage means connected for receiving, retaining, and reproducing the values of Hadamard transform coefficient signals representative of the values of the two-dimensional Hadamard coefficients of said scene.

4. The calculating machine of claim 3 wherein said first means and said second means further comprise summing circuits connected to receive said Hadamard transform coefficient signals from said storage means.

5. The calculating machine of claim 1 wherein said scene is a visual scene and wherein said first means and said second means comprise encoding means for producing an electrical signal representative of said visual scene.

6. The calculating machine of claim 1 wherein said first signal, said second signal, said third signal, and said output signal are digital signals.

7. The calculating machine of claim 1 wherein said first signal, said second signal, said third signal, and said output signal are analog signals.

8. A computing machine for extracting the angle of line and edge information from scene data, comprising in combination:

means for producing a plurality of element signals, each of said element signals being representative of one of the elements of a two-dimensional, sequency ordered, Hadamard transform matrix, $[H_{S_x,S_y}]$, of a scene including line and edge angle information, the sequency of said matrix being defined with respect to an $x$-axis and a $y$-axis of said scene;

directed search means connected to receive said plurality of element signals, to logically compare the magnitude of said element signals in logical sequence, and to produce from said comparison an $x$-address signal a $y$-address signal, said $x$-address signal and said $y$-address signal being respectively representative of the column position and of the row position of a key element, $H_{x',y'}$, of said sequency ordered Hadamard matrix where said key element is associated with the end of a ridge or maximum value elements in said Hadamard matrix; and first calculating means connected for receiving said $x$-address signal and said $y$-address signal for producing therefrom an angle-output signal representative of the arctangent of the quotient of said $x$-address signal divided by said $y$-address signal, whereby said angle-output signal represents the magnitude of the angle of line and edge information in said scene data with respect to said $x$-axis.

9. The machine of claim 8 further comprising second calculating means connected for receiving said $x$-address signal, said $y$-address signal, and said plurality of element signals, and for calculating therefrom a sign signal representative of the value of the function:

ABS.VALUE $[H_{x'+1,y'} + H_{x',y'+1}]$ – ABS.VALUE $[H_{x',y'} + H_{x'+1,y'+1}]$ wherein $$\begin{bmatrix} H_{x',y'} & H_{x'+1,y'} \\ H_{x',y'+1} & H_{x'+1,y'+1} \end{bmatrix}$$

is a submatrix of $[H_{S_x,S_y}]$ including $H_{x',y'}$ as a principal element, whereby said sign signal is representative of the sign of the angle of line and edge information in said scene data with respect to said $x$-axis.

10. The machine of claim 9 wherein:

said directed search means comprises means for sequentially examining the values of the signals in selected subsets of signals taken from said plurality of element signals and for determining, by arithmetic and logical operations thereon, the identity of that signal in each of said subsets having a value greater than the value of all other signals in that subset; and wherein the selection of the signals comprising said subsets is determined by logical and arithmetic functions connected so that the first examination is a subset consisting of the matrix elements $H_{0,1}$, $H_{1,1}$, and $H_{1,0}$; and each sequential examination following said first examination in an examination of a next subset consisting of matrix elements selected by arithmetic operations upon the identity of the signal determined by examination of a preceding sequential subset.

11. The machine of claim 10, wherein the signals in each next subset consist of the signals associated with the Hadamard transform coefficient matrix element $H_{2x+1, 2y+1}$ and with the matrix element $H_{2x+1,2y}$ if $x \geq y$ and with the matrix elements $H_{2x,2y+1}$ and $H_{2x+1,2y+1}$ if $y \geq x$; where $x$ and $y$ are the two-dimensional sequencies associated with the signal determined by the examination of the preceding sequential subset.

12. The machine of claim 11 wherein said sequential examination of subsets is terminated if a next subset to be examined would contain element signals associated with Hadamard transform coefficient matrix elements having sequencies greater than (N/2)−1, where N is the rank of the Hadamard transform coefficient matrix, $H_{sx,sy}$.

13. The machine of claim 12 wherein the sequential examination of subsets is terminated if no signal in a subset undergoing examination is determined to have a value greater than the value of all other signals in that subset.

14. The machine of claim 13 wherein said key element, $H_{x',y'}$, is the Hadamard transform coefficient matrix element associated with the last signal determined upon said sequential examination of said subsets of element signals.

15. The machine of claim 14 wherein said directed search means further comprise storage means connected for receiving, retaining, and reproducing the values of said plurality of element signals.

16. The machine of claim 15 wherein said first calculating means comprise memory-table means including values of said angle-output signal associated with corresponding values of said x-address signal and said y-address signal; and wherein said directed search means comprise memory-table means having the identity of signals in said subset associated with the identity of corresponding Hadamard transform coefficient matrix elements.

17. The machine of claim 16 wherein said plurality of element signals, said x-address signal, said y-address signal, said angle signal, and said sign signal comprise digital data signals.

18. The machine of claim 16 wherein said plurality of element signals, said x-address signal, said y-address signal, said angle output signal, and said sign signal comprise analog signals.

* * * * *